US012603885B2

(12) United States Patent
Muto

(10) Patent No.: US 12,603,885 B2
(45) Date of Patent: Apr. 14, 2026

(54) METHOD, RECORDING MEDIUM, AND SERVER FOR USER AUTHENTICATION BY COMPUTER

(71) Applicant: Konica Minolta, Inc., Tokyo (JP)

(72) Inventor: Hikaru Muto, Itami (JP)

(73) Assignee: Konica Minolta, Inc., Tokyo (JP)

( * ) Notice: Subject to any disclaimer, the term of this patent is extended or adjusted under 35 U.S.C. 154(b) by 201 days.

(21) Appl. No.: 18/209,047

(22) Filed: Jun. 13, 2023

(65) Prior Publication Data

US 2024/0022566 A1 Jan. 18, 2024

(30) Foreign Application Priority Data

Jul. 12, 2022 (JP) ................................... 2022-111806

(51) Int. Cl.
H04L 9/40 (2022.01)

(52) U.S. Cl.
CPC ........ H04L 63/0876 (2013.01); H04L 63/102 (2013.01)

(58) Field of Classification Search
CPC .......................... H04L 63/0876; H04L 63/102
USPC ............................................................. 726/4
See application file for complete search history.

(56) References Cited

U.S. PATENT DOCUMENTS

| | | | | |
|---|---|---|---|---|
| 6,968,385 | B1 * | 11/2005 | Gilbert ................... | H04L 63/083 |
| | | | | 726/20 |
| 7,308,498 | B1 * | 12/2007 | Olsen .................... | H04L 67/563 |
| | | | | 709/224 |

| | | | | |
|---|---|---|---|---|
| 11,122,038 | B1 | 9/2021 | Schuster et al. | |
| 2004/0030781 | A1 * | 2/2004 | Etesse ...................... | G09B 7/02 |
| | | | | 709/225 |
| 2020/0076751 | A1 * | 3/2020 | Shetye ................... | G06Q 30/02 |
| 2020/0366685 | A1 | 11/2020 | Ullrich | |
| 2022/0407878 | A1 * | 12/2022 | Harris ................. | H04L 63/1425 |

FOREIGN PATENT DOCUMENTS

| | | |
|---|---|---|
| EP | 3896588 A1 | 10/2021 |
| JP | 2015007829 A | 1/2015 |

OTHER PUBLICATIONS

O'Reilly, Start trial, Apr. 17, 2022, https://web.archive.org/web/20220417180744/https://www.oreilly.com/start-trial/ (Year: 2022).*
Esqsites, How our Free Trial Works, Aug. 11, 2016, https://web.archive.org/web/20160811215029/https://www.esqsites123.com/how-our-free-trial-works (Year: 2016).*
Extended European Search Report issued in corresponding European Patent No. 23176727.8, dated Oct. 31, 2023 (9 pages).
Office Action issued in counterpart European Patent Application No. 23176727.8 mailed Dec. 19, 2025 (7 pages).

* cited by examiner

*Primary Examiner* — Zi Ye
(74) *Attorney, Agent, or Firm* — Osha Bergman Watanabe & Burton LLP

(57) ABSTRACT

A method executed by a hardware processor of a computer to manage use of a service at a terminal device, includes: receiving, from the terminal device via a communication network, identification information and authentication information that are input by a user to the terminal device to log in to the service; and in a case that a login to the service is not permitted based on the identification information and the authentication information, permitting a temporary login in which a restriction is placed on some functions of the service.

14 Claims, 13 Drawing Sheets

WORKSHEET INFORMATION
CAMERA IMAGE
VOICE INFORMATION
TERMINAL INFORMATION
USER OPERATION INFORMATION

WORKSHEET INFORMATION
CAMERA IMAGE
VOICE INFORMATION
TERMINAL INFORMATION
USER OPERATION INFORMATION

FIG. 6
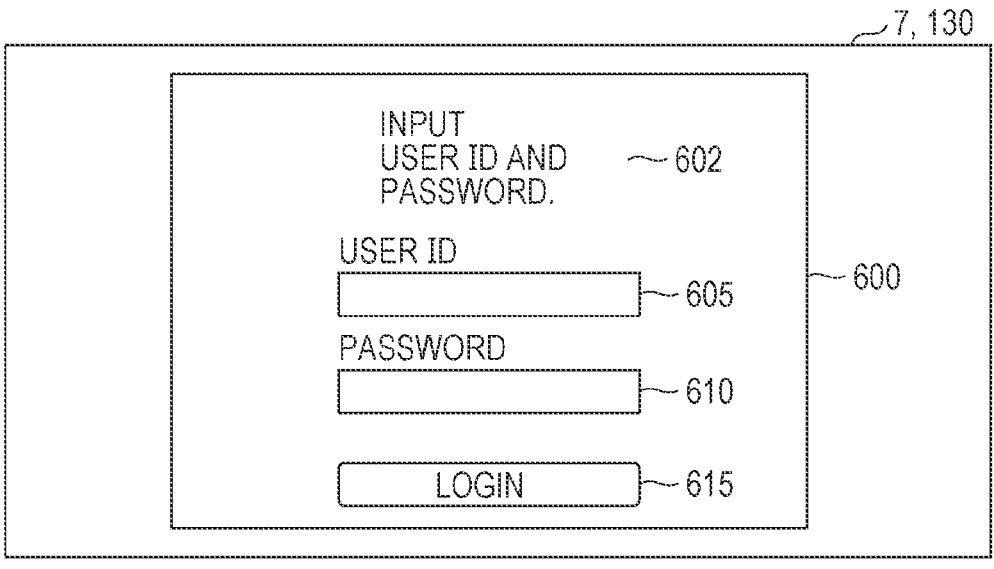
INPUT
USER ID AND ~ 602
PASSWORD.
USER ID
~ 605
PASSWORD
~ 610
LOGIN ~ 615
~ 7, 130
~ 600
ACCOUNT LOCK
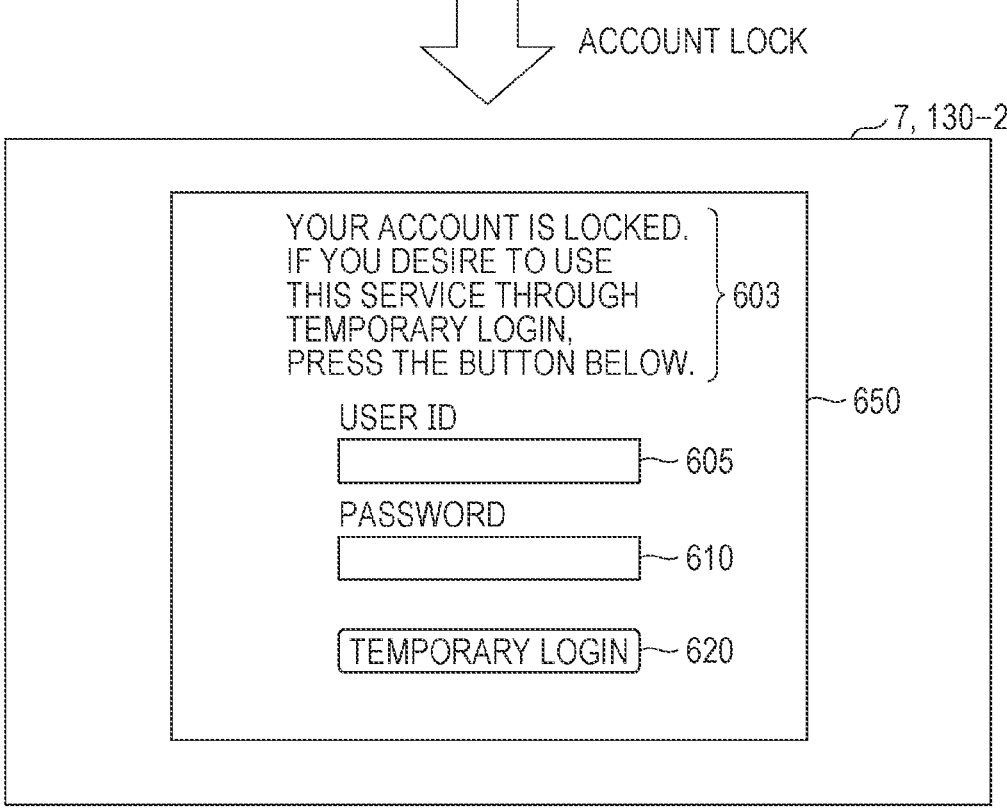
YOUR ACCOUNT IS LOCKED.
IF YOU DESIRE TO USE
THIS SERVICE THROUGH ⎬ 603
TEMPORARY LOGIN,
PRESS THE BUTTON BELOW.
USER ID
~ 605
PASSWORD
~ 610
TEMPORARY LOGIN ~ 620
~ 7, 130-2
~ 650

FIG. 7
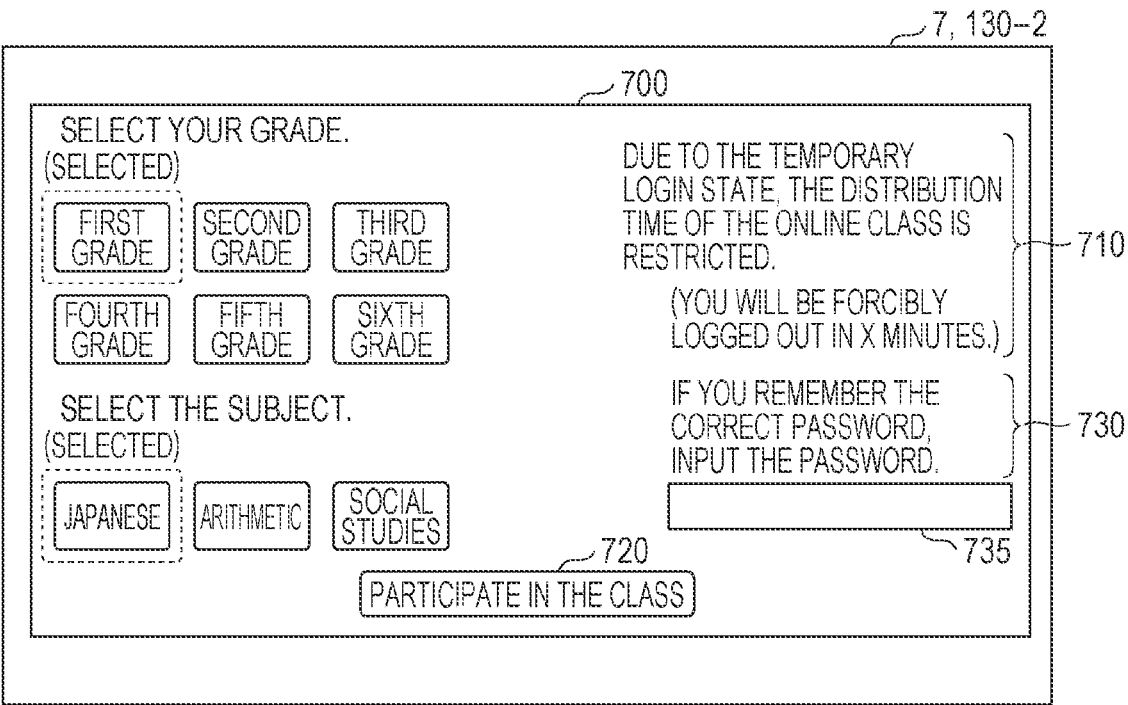
AFTER INPUT OF
CORRECT PASSWORD
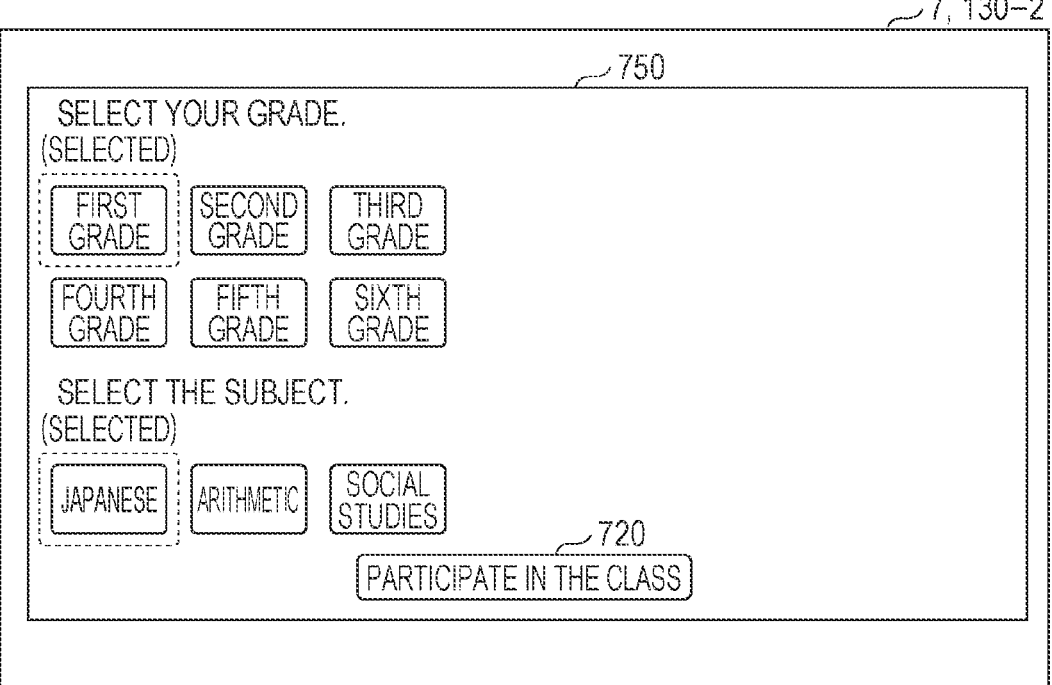

Figure 8:
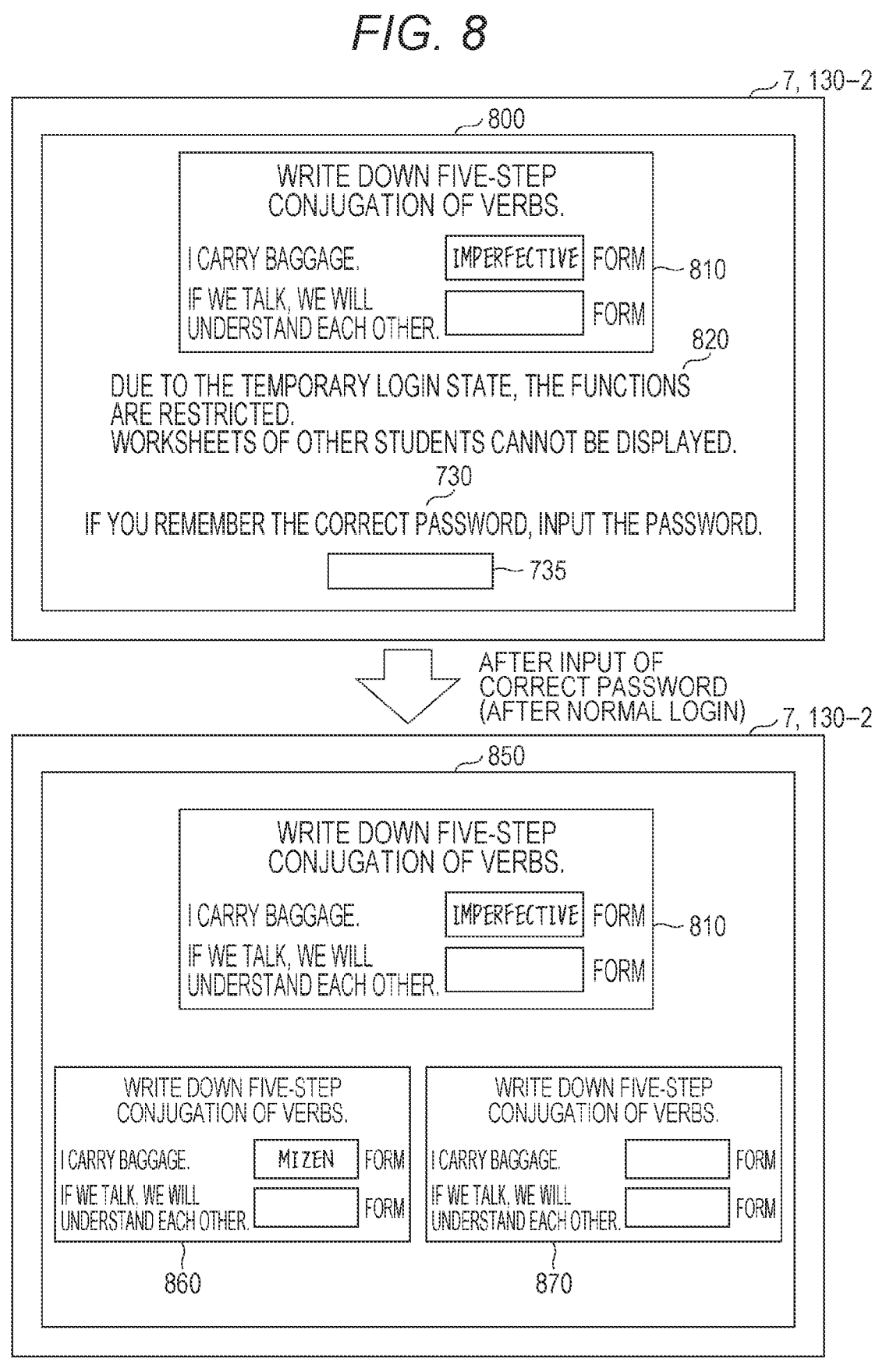

WRITE DOWN FIVE-STEP
CONJUGATION OF VERBS.

I CARRY BAGGAGE.    | IMPERFECTIVE | FORM   — 810

IF WE TALK, WE WILL
UNDERSTAND EACH OTHER.    |   | FORM

820

DUE TO THE TEMPORARY LOGIN STATE, THE FUNCTIONS
ARE RESTRICTED.
WORKSHEETS OF OTHER STUDENTS CANNOT BE DISPLAYED.

730

IF YOU REMEMBER THE CORRECT PASSWORD, INPUT THE PASSWORD.

|   | — 735

AFTER INPUT OF
CORRECT PASSWORD
(AFTER NORMAL LOGIN)

7, 130−2

850

WRITE DOWN FIVE-STEP
CONJUGATION OF VERBS.

I CARRY BAGGAGE.    | IMPERFECTIVE | FORM   — 810

IF WE TALK, WE WILL
UNDERSTAND EACH OTHER.    |   | FORM

WRITE DOWN FIVE-STEP
CONJUGATION OF VERBS.

I CARRY BAGGAGE.   | MIZEN | FORM

IF WE TALK, WE WILL
UNDERSTAND EACH OTHER.   |   | FORM

WRITE DOWN FIVE-STEP
CONJUGATION OF VERBS.

I CARRY BAGGAGE.   |   | FORM

IF WE TALK, WE WILL
UNDERSTAND EACH OTHER.   |   | FORM 860                      870

*FIG. 9*

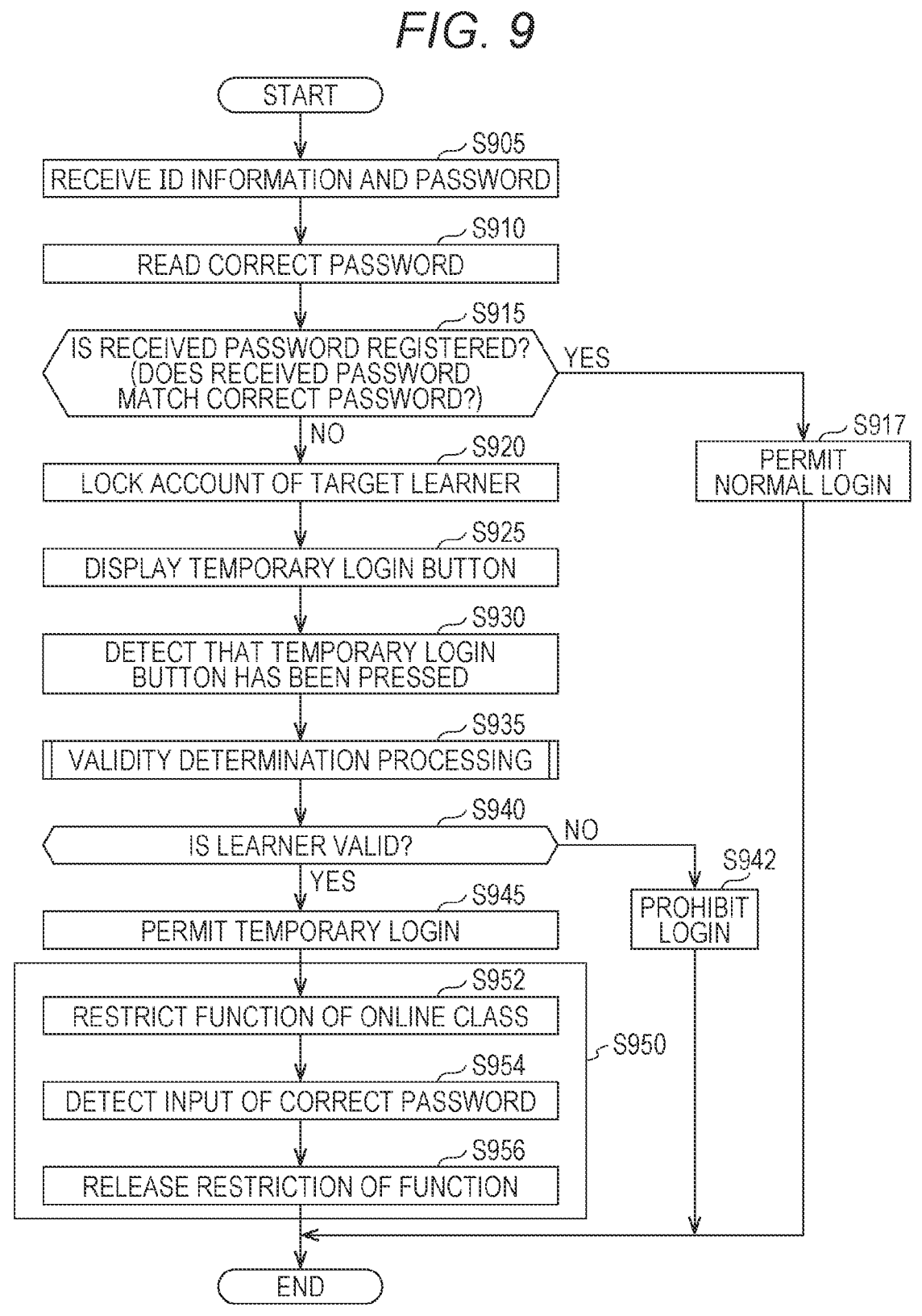

START

S905
RECEIVE ID INFORMATION AND PASSWORD

S910
READ CORRECT PASSWORD

S915
IS RECEIVED PASSWORD REGISTERED?
(DOES RECEIVED PASSWORD
MATCH CORRECT PASSWORD?) — YES

NO

S917
PERMIT
NORMAL LOGIN

S920
LOCK ACCOUNT OF TARGET LEARNER

S925
DISPLAY TEMPORARY LOGIN BUTTON

S930
DETECT THAT TEMPORARY LOGIN
BUTTON HAS BEEN PRESSED

S935
VALIDITY DETERMINATION PROCESSING

S940
IS LEARNER VALID? — NO

YES

S942
PROHIBIT
LOGIN

S945
PERMIT TEMPORARY LOGIN

S952
RESTRICT FUNCTION OF ONLINE CLASS

S950

S954
DETECT INPUT OF CORRECT PASSWORD

S956
RELEASE RESTRICTION OF FUNCTION

END

FIG. 11

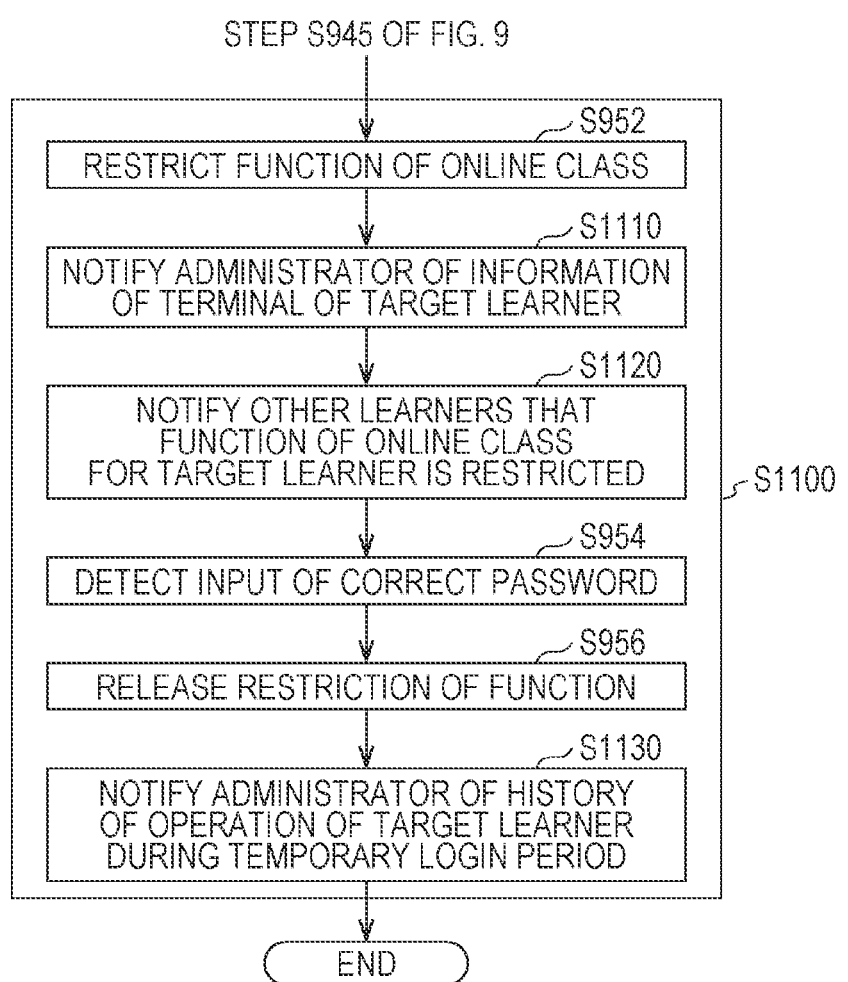

STEP S945 OF FIG. 9

S952
RESTRICT FUNCTION OF ONLINE CLASS

S1110
NOTIFY ADMINISTRATOR OF INFORMATION OF TERMINAL OF TARGET LEARNER

S1120
NOTIFY OTHER LEARNERS THAT FUNCTION OF ONLINE CLASS FOR TARGET LEARNER IS RESTRICTED

S1100

S954
DETECT INPUT OF CORRECT PASSWORD

S956
RELEASE RESTRICTION OF FUNCTION

S1130
NOTIFY ADMINISTRATOR OF HISTORY OF OPERATION OF TARGET LEARNER DURING TEMPORARY LOGIN PERIOD

END

STEP S945 OF FIG. 9

S952
RESTRICT FUNCTION OF ONLINE CLASS

S1110
NOTIFY ADMINISTRATOR OF INFORMATION
OF TERMINAL OF TARGET LEARNER

S1210        S1200
RECEIVE REQUEST FOR INTERRUPTION
OF DISTRIBUTION OF ONLINE CLASS
TO TERMINAL OF TARGET LEARNER

S1220
INTERRUPT DISTRIBUTION OF ONLINE
CLASS TO TERMINAL OF TARGET LEARNER

END

1

METHOD, RECORDING MEDIUM, AND SERVER FOR USER AUTHENTICATION BY COMPUTER

CROSS-REFERENCE TO RELATED APPLICATIONS

This application claims priority from Japanese patent Application No. 2022-111806, filed on Jul. 12, 2022, the contents of which are incorporated herein by reference in their entirety.

BACKGROUND

Technical Field

The present disclosure relates to authentication of a user of an information processing apparatus, and more specifically, to authentication of a user who receives provision of a service through the information processing apparatus.

Description of Related Art

A user of an information processing apparatus sometimes inputs a user identification (ID) and authentication information such as a password or a passcode to the information processing apparatus in order to obtain desired information or to receive provision of a service.

Regarding the authentication of the user, for example, Japanese Patent Application Laid-Open No. 2015-007829 (JP 2015-007829 A) discloses an information management system "storing registration information for which a user has a usage right to check existence of the registration information and to use the registration information" (see paragraph [0009]). According to this system, "The passcode receiving section implements the function of receiving permission information. The passcode receiving section receives input of a passcode that is usage permission information notified from a user having the access right." (see paragraph [0032]).

In order to provide a service such as an educational service to a user through an information processing apparatus, the content data of the service may be distributed to the information processing apparatus. The user of the information processing apparatus may input both identification information and authentication information of the user to the information processing apparatus in order to log in to such a service. The authentication information needs to be correct and associated with the identification information. When the correct authentication information is input, the login of the user is permitted.

On the other hand, there is a case where the correct authentication information is not input, such as a case where the user forgets the authentication information. In this case, the login of the user may not be permitted. As a result, the opportunity to use the service is lost until the user inputs the correct authentication information. Such a loss of the opportunity causes more inconvenience to the user as the service is more beneficial. Therefore, there is a need for a technique that appropriately enables use of a service even in a case where the user cannot input the correct authentication information.

SUMMARY

The present disclosure has been made in view of the above background, and provides a technique that appropriately enables use of a service even in a case where a user cannot input correct authentication information.

To deliver the abovementioned technique, according to an aspect of the present invention, a method executed by a computer to manage use of a service comprises: receiving identification information and authentication information of a user input to a terminal device to log in to the service; and permitting a temporary login in which some functions of the service are restricted, on a basis of a fact that a login based on the identification information and the authentication information is not permitted.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 6 is a diagram illustrating screens displayed when a learner attempts to log in to an educational service;

FIG. 7 is a diagram for explaining screens displayed on a monitor of a terminal in a case where the learner is in a temporary login state and a normal login state;

FIG. 8 is a diagram illustrating screens displayed on the monitor when a button is operated;

FIG. 9 is a flowchart illustrating an example of processing executed by the management terminal;

FIG. 11 is a flowchart illustrating another example (step S1100) of the processing executed by the management terminal after step S945;

DETAILED DESCRIPTION OF EMBODIMENTS

Figure 1:
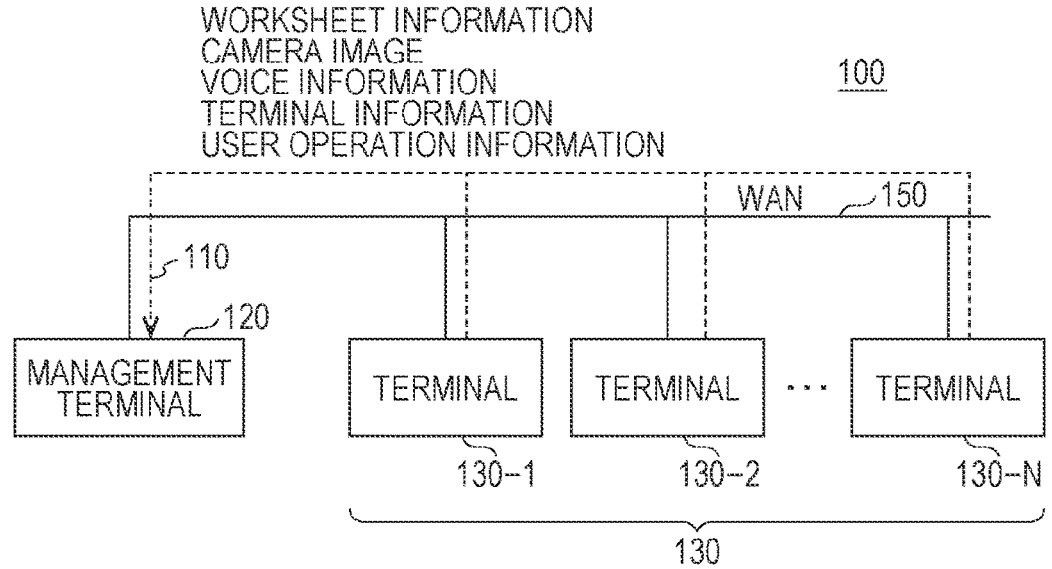
FIG. 1 is a diagram illustrating a schematic configuration of a system according to one or more embodiments.

Hereinafter, embodiments of the present invention will be described with reference to the drawings. However, the scope of the invention is not limited to the disclosed embodiments. In the following description, the same components are denoted by the same reference numerals. This holds true for names and functions. Therefore, detailed descriptions thereof will not be repeated.

In one or more embodiments, as an example of a service provided through a terminal device of a user (user), an online education service (also simply referred to as "educational service") for educating the user is used. In these examples, the educational service is a service to distribute data of an online class conducted in an educational institution such as a school or a tutoring school. The data of the online class is an example of content data distributed to the terminal device in order to provide the educational service. The content data refers to data indicating information perceived by the user, and is, for example, a character, a figure, a voice, an image, a video, or a combination of at least two thereof.

<System Configuration>

An online education system 100 (hereinafter, simply referred to as "system 100") that supports an educational service will be described with reference to FIG. 1. FIG. 1 is a diagram illustrating a schematic configuration of the system 100 according to one or more embodiments.

The system 100 includes a management terminal 120 and N terminals 130-1, 130-2 . . . 130-N (terminals for learners). The N terminals are collectively referred to as "terminal 130".

The management terminal 120 and the terminals 130-1, 130-2 . . . 130-N are connected to a communication network such as the Internet or another wide area network (WAN) 150.

The management terminal 120 and the terminal 130 can communicate with each other. The configuration of each of the management terminal 120 and the terminal 130 will be described later.

The management terminal 120 receives an output signal 110 from the terminal 130. The output signal 110 includes worksheet information, information representing a camera image, voice information, terminal information, and user operation information. The output signal 110 may include at least one of these pieces of information. The output signal 110 further includes ID information and a password (both described later) of the user of the terminal 130.

The worksheet information represents a worksheet of a learner who participates in an online class. The camera image is information representing an image of the user, and specifically represents an image captured by a camera (described later) built in the terminal 130. The voice information is information representing the voice of the user, and specifically represents a voice input to a microphone (described later) built in the terminal 130. The terminal information is information for specifying the terminal 130, and details thereof will be described later. The user operation information is information indicating the content of a user operation of the terminal 130.

The management terminal 120 is an information processing apparatus that is used by the administrator of the system 100 who is the user and manages the use of the educational service by the learner. In one or more embodiments, the administrator is a teacher of an online class (in this example, a teacher of a school), and the learner is a student of a school (for example, a small child). The management terminal 120 manages the worksheet of the learner. The management terminal 120 may be any of a desktop, a laptop, or a notebook. The management terminal 120 is an example of "server" or "computer" of the present disclosure.

The terminal 130 is an information processing apparatus used by the learner who is the user. The terminal 130 may be any of a desktop, a laptop, or a notebook. The terminal 130 is an example of "terminal device" of the present disclosure.

In a case where the learner can input correct authentication information (in this example, a password) to the terminal 130, the learner can log in to the educational service. On the other hand, in a case where the learner cannot input the correct password to the terminal 130, the learner may not be able to log in to the educational service.

In some embodiments, if the number of times the incorrect password is input to the terminal 130 exceeds a predetermined limited number of times, the account of the learner is locked. The account refers to a right to use a service provided on the Internet. The account lock is a function of stopping the account from the viewpoint of security. The limited number of times is assumed to be 1 for easy understanding, but may be another positive number determined in advance as appropriate. Note that the account may not necessarily be locked.

Figure 2:
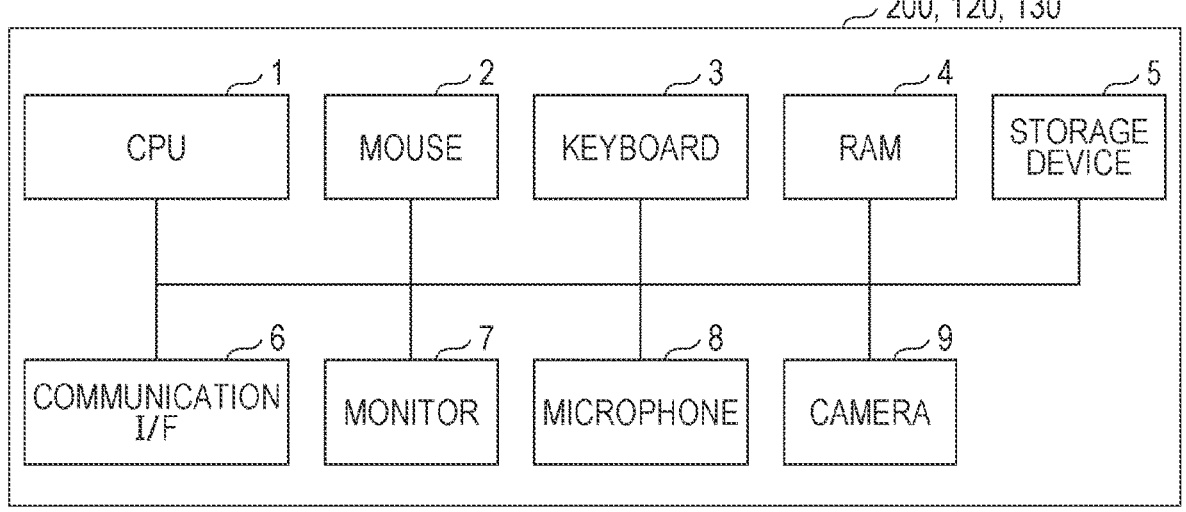
FIG. 2 is a block diagram illustrating a hardware configuration of a computer device that functions as a management terminal or a terminal.

Configurations of the management terminal 120 and the terminal 130 will be described with reference to FIG. 2. FIG. 2 is a block diagram illustrating a hardware configuration of a computer device 200 that functions as the management terminal 120 or the terminal 130 according to one or more embodiments.

The computer device 200 includes a CPU (a hardware processor) 1, a mouse 2, a keyboard 3, a random access memory (RAM) 4, a storage device 5, a communication interface (I/F) 6, a monitor 7, a microphone 8, and a camera 9. The individual components are connected to each other by a data bus.

The CPU 1 executes an instruction(s) stored in the storage device 5. As an example, the CPU 1 causes the monitor 7 to display a screen for the user interface (UI) of the online class in accordance with the progress of the class.

The mouse 2 and the keyboard 3 are operated by the user of the computer device 200. This operation is, for example, an operation for editing the account information (to be described later) of the user or an operation for doing homework for the online class.

The RAM 4 volatilely stores data generated by execution of the instruction by the CPU 1 or data input via the mouse 2 or the keyboard 3. The storage device 5 corresponds to, for example, a hard disk device or a solid state drive (SSD) device, and stores data in a nonvolatile manner. This data is, for example, a control program for controlling the computer device 200 and recording of online classes conducted in the past.

The communication interface 6 enables communication between the computer device 200 and a device outside the computer device. The monitor 7 displays a screen for the UI of the online class. The microphone 8 receives an input of an utterance voice of the user (for example, a teacher or a student) of the computer device 200. The voice information indicating the voice is transmitted to another computer device 200. The camera 9 captures an image (for example, an image of the face of the user) of the user of the computer device 200. This image can be displayed on another computer device 200.

The processing in the computer device 200 is implemented by the cooperation of each piece of hardware and software executed by the CPU 1, in one or more embodiments. Such software may be stored in advance in the storage device 5. The software may be stored in a compact disc-read only memory (CD-ROM) or another recording medium (non-transitory computer readable recording medium) and distributed as a computer program. Alternatively, the software may be provided as an application program that can be downloaded by an information provider connected to a so-called Internet. Such software is read from the recording medium by an optical disk drive device (not illustrated) or another reading device, or is downloaded via the communication interface 6, and then is temporarily stored in the storage device 5. The software is read from the storage device 5 by the CPU 1, stored in the RAM 4 in the form of an executable instruction, and executed by the CPU 1.

<Configuration of Terminal Information>

Figure 3:
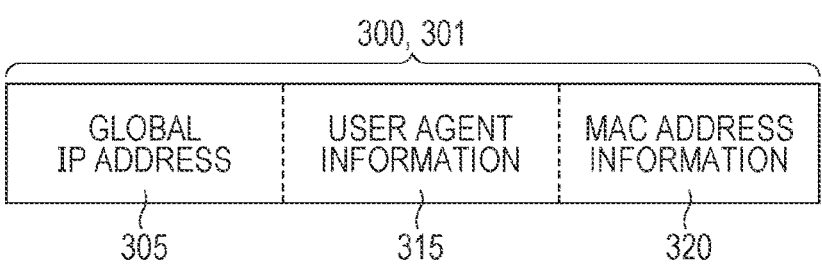
FIG. 3 is a diagram illustrating various types of information constituting terminal information.

Terminal information 300 transmitted from the terminal 130 to the management terminal 120 will be described with reference to FIG. 3. FIG. 3 is a diagram illustrating various types of information constituting the terminal information 300 according to one or more embodiments.

The terminal information 300 includes a global internet protocol (IP) address 305, user agent information 315, and media access control (MAC) address information 320.

The global IP address 305 is a part of an IP address that is assigned to the terminal 130 to identify the terminal 130 on the Internet, and is uniquely assigned to the terminal 130.

The user agent information 315 is information of the terminal 130 notified to the management terminal 120 in a case where a request is transmitted (output) from the terminal 120 to the management terminal 130.

The MAC address information 320 is information specific to the terminal 130 assigned at the time of manufacturing the terminal 130. The terminal information 300 transmitted from the terminal 130-1, 130-2 to the management terminal 120 is also referred to as terminal information 301, 302, respectively.

<Data Structure of Learner Information>

Figure 4:
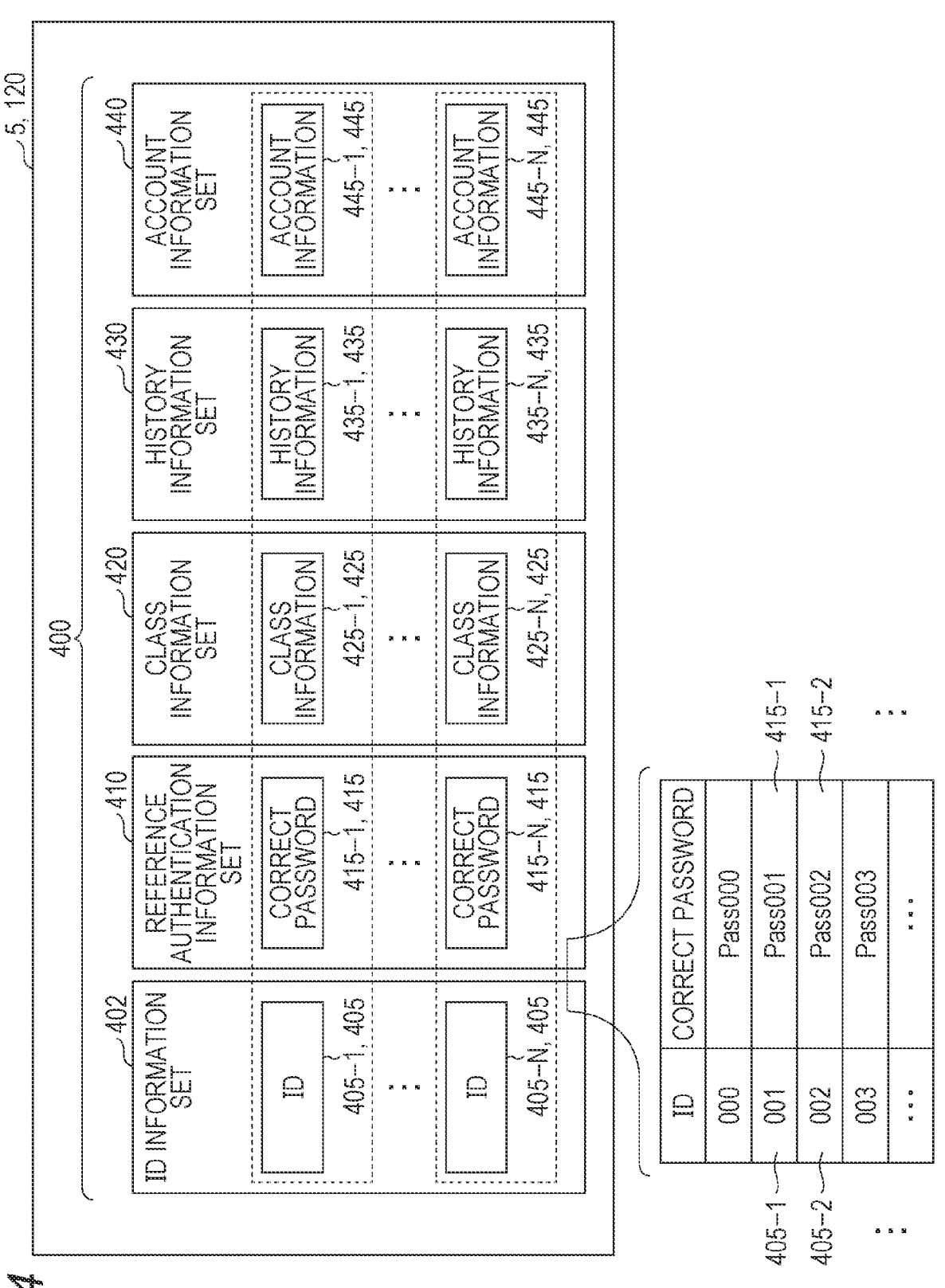
FIG. 4 is a diagram illustrating various types of information constituting learner information.

A data structure of learner information 400 stored in the storage device 5 of the management terminal 120 will be described with reference to FIG. 4. FIG. 4 is a diagram illustrating various types of information constituting the learner information 400 according to one or more embodiments.

The learner information 400 includes an identification (ID) information set 402, a reference authentication information set 410, a class information set 420, a history information set 430, and an account information set 440.

The ID information set 402 includes pieces of ID information 405-1 . . . 405-N. The pieces of ID information 405-1 . . . 405-N are collectively referred to as "ID information 405". The ID information 405 is assigned in advance to each learner (the user of the terminal 130), and is input to the terminal 130 in order for the learner to log in to the educational service.

The reference authentication information set 410 is a set of authentication information to be referred to for the purpose of determining permission/non-permission of login to the educational service by the learner. The reference authentication information set 410 includes correct passwords 415-1 . . . 415-N. In this case, the learner is required to input a password to the terminal 130 as authentication information for logging in to the educational service. The password may be replaced with a passcode. The correct passwords 415-1 . . . 415-N are collectively referred to as "correct password 415". The correct password 415 is required to be input to the terminal 130 together with the ID information 405 in order for the corresponding learner to log in to the educational service, and is assigned to each learner.

The class information set 420 includes pieces of class information 425-1 . . . 425-N. The pieces of class information 425-1 . . . 425-N are collectively referred to as "class information 425". The class information 425 indicates a class to which the corresponding learner belongs (in this example, a class at school), and is assigned to each learner.

The history information set 430 includes pieces of history information 435-1 . . . 435-N. The pieces of history information 435-1 . . . 435-N are collectively referred to as "history information 435". The history information 435 indicates the history of use of the educational service by the corresponding learner and is assigned to each learner. This history is, for example, the history of the type (the subject) of the online class in which the learner has participated, the history of a time period in which the learner has participated in the online class, the history of the terminal information 300 when the learner has participated in the online class, or the history of feature information (described later) of the learner. The history information 435 is basically created (updated) for the online class each time the learner participates in the online class.

The account information set 440 includes pieces of account information 445-1 . . . 445-N. The pieces of account information 445-1 . . . 445-N are collectively referred to as "account information 445". The account information 445 indicates various types of setting information of the account of the corresponding learner, and is assigned to each learner. This information is used, for example, to set the name of the learner or the display mode of the screen displayed on the monitor 7 of the terminal 130 of the learner. The learner can edit the account information 445 of the learner by operating the terminal 130.

As described above, each of the correct password 415, the class information 425, the history information 435, and the account information 445 is registered in the storage device 5 of the management terminal 120 in association with the ID information 405.

As specifically described below, the management terminal 120 determines whether or not the password input to the terminal 130 by the learner is correct. In a case where the password is correct, the management terminal 120 permits the learner to log in to the educational service. On the other hand, in a case where the password is incorrect, the management terminal 120 determines whether or not the user is authorized (valid) on the basis of the output signal 110. The management terminal 120 permits the learner to log in to the educational service on the basis of the authentication (validity) of the user.

According to such a configuration, even in a case where the learner cannot input the correct password, the learner is permitted to log in on a condition that the user is authorized (valid). When the login is permitted, the learner can use the educational service (participate in the online class). As a result, it is possible to avoid a situation in which the opportunity to use the educational service is completely lost until the learner can input the correct password (for example, until the learner remembers the correct password or is informed of the correct password by another person). Therefore, even in a case where the learner cannot input the correct password, it is possible to appropriately use the educational service. As a result, the learner can be benefited.

In some embodiments, the login permitted on the basis of the authentication (validity) of the user in a case where the password is incorrect is assumed to be "temporary login" described below. The login permitted as described above may be a normal login (a login permitted in a case where the correct password is input) on the basis of the ID information and the password.

The temporary login may be permitted on a condition that the normal login is not permitted. The temporary login is different from the normal login in that a restriction is placed on some functions of the service thereafter. The mode of the functional restriction will be described later. The temporary login may be a login to the educational service permitted in a state where the account of the learner is locked.

When the function is restricted as described above, it is possible to motivate the learner who is temporarily logged in so as to input the correct password at the next use of the educational service in order to avoid inconvenience caused by the functional restriction. Furthermore, from the viewpoint of convenience, the learner who is temporarily logged in can be distinguished from the learner who is normally logged in.

Permitting the temporary login includes causing the terminal 130 to display an image that accepts or receives a request for the temporary login, receiving the request for the temporary login on the image from the terminal 130, and permitting the temporary login in response to the reception of the request. Details of processing involving the permission of the temporary login will be described later. As a result, the temporary login can be permitted on the basis of the intention or a choice (selection) of the learner.

<Functional Configuration of Management Terminal>

Figure 5:
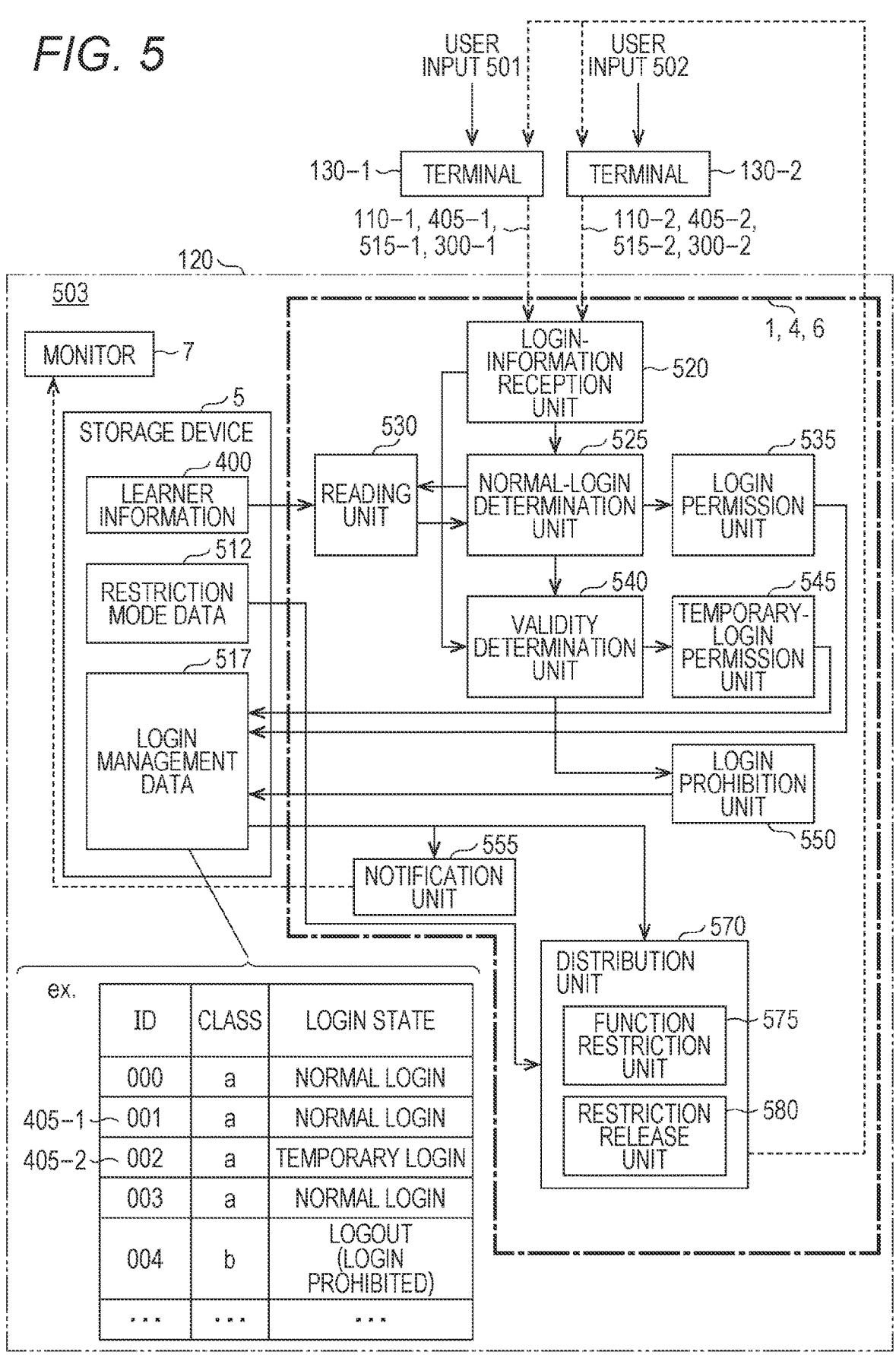
FIG. 5 is a block diagram illustrating functions of the management terminal.

A functional configuration of the management terminal 120 will be described with reference to FIG. 5. FIG. 5 is a block diagram illustrating functions of the management terminal 120 according to one or more embodiments.

The management terminal 120 includes, as functional components thereof, a login-information reception unit 520, a normal-login determination unit 525, a reading unit 530, a login permission unit 535, a validity (authentication) determination unit 540, a temporary-login permission unit 545, a login prohibition unit 550, a notification unit 555, and a distribution unit 570.

The functions of the normal-login determination unit 525, the reading unit 530, the login permission unit 535, the validity (authentication) determination unit 540, the temporary-login permission unit 545, and the login prohibition unit 550 are performed when the CPU 1 of the management terminal 120 executes an instruction(s) stored in the storage device 5. The functions of the login-information reception unit 520, the notification unit 555, and the distribution unit 570 are performed when the CPU 1 and the communication interface 6 operate in cooperation.

The storage device 5 of the management terminal 120 stores data for the functions described above. Specifically, the storage device 5 stores restriction mode data 512 and login management data 517 in addition to the learner information 400. These data will be described later.

The login-information reception unit 520 receives the output signal 110 including the ID information 405, the password 515, and the terminal information 300 from each of a plurality of terminals 130. In this example, the login-information reception unit 520 receives, from the terminal 130-1, an output signal 110-1 including the ID information 405-1 and a password 515-1 of the learner 501 who is the user, and the terminal information 300-1. Each of the ID information 405-1 and the password 515-1 is input to the terminal 130-1 by the learner 501 who attempts to log in to the educational service.

Similarly, the login-information reception unit 520 receives, from the terminal 130-2, an output signal 110-2 including the ID information 405-2 and a password 515-2 of the learner 502 who is the user, and the terminal information 300-2. Each of the ID information 405-2 and the password 515-2 is input to the terminal 130-2 by the learner 502 who attempts to log in to the educational service. The result of the reception by the login-information reception unit 520 is transmitted (output) to the normal-login determination unit 525 and the validity (authentication) determination unit 540.

The normal-login determination unit 525 determines whether or not the normal login (the login on the basis of the ID information 405 and the password 515) of each of the learners 501 and 502 is permitted. Specifically, the normal-login determination unit 525 determines whether or not the password 515 received by the login-information reception unit 520 matches the correct password 415 registered in the management terminal 120 in association with the ID information 405. The normal-login determination unit 525 transmits (outputs) the ID information 405 from the login-information reception unit 520 to the reading unit 530, causes the reading unit 530 to execute processing of reading the correct password 415, and executes the determination processing in accordance with the result of the reading processing.

The reading unit 530 executes the processing of reading the correct password 415 based on the ID information 405-1 and 405-2 from the normal-login determination unit 525. Specifically, for each of the learners 501 and 502, the reading unit 530 reads the correct password 415 associated with the ID information 405 from the learner information 400. The read correct password 415 is transmitted (output) to the normal-login determination unit 525.

The login permission unit 535 permits the normal login of the learner to the educational service in accordance with the determination result of the normal-login determination unit 525. Specifically, in a case where the password 515 is registered in the management terminal 120 in association with the ID information 405 (in other words, in a case where the password 515 is correct), the login permission unit 535 permits the normal login of the learner. In this example, since the password 515-1 is registered in the management terminal 120 in association with the ID information 405-1, the normal login of the learner 501 is permitted.

When permitting the normal login of the learner, the login permission unit 535 writes that the login state of the learner is the normal login state in the login management data 517. The login management data 517 is related to the learner information 400, indicates the login state of each learner, and is used to manage the login state.

On the other hand, in a case where the password 515 is not registered in the management terminal 120 in association with the ID information 405 (in other words, in a case where the password 515 is incorrect), the login permission unit 535 does not permit the normal login. In this example, since the password 515-2 is not registered in the management terminal 120 in association with the ID information 405-2, the normal login of the learner 502 is not permitted and the account of the learner 502 is locked.

The validity (authentication) determination unit 540 determines whether or not the learner (in this example, the learner 502) whose account is locked is valid (authorized). This determination processing is also referred to as "validity (authentication) determination processing". The validity (authentication) determination processing is executed on the basis of the output signal 110. The result of the validity (authentication) determination processing is transmitted (output) to the temporary-login permission unit 545 and the login prohibition unit 550.

In one or more embodiments, the management terminal 120 executes the validity (authentication) determination processing as follows. First, the management terminal 120 determines the class to which the learner 502 belongs on the basis of the class information 425 associated with the ID information 405-2 included in the output signal 110-2. Next, the management terminal 120 determines the global IP address 305 of the terminal 130 (in this example, the terminal 130-1 of the learner 501 who is normally logged in) of another learner belonging to the class. Furthermore, the management terminal 120 determines whether or not the global IP address 305 of the terminal 130-2 of the learner 502 whose account is locked matches the global IP address 305 of the terminal 130-1. Whether or not the learner 502 is valid (authorized) is determined on the basis of the result of the determination processing. First, a case where these global IP addresses 305 match will be described.

In this case, it is considered that the learner 502 attempts to participate in the online class in the same building (for example, a school building of a school) as the building in which the learner 501 belonging to the same class is located. Therefore, the learner 502 is highly likely to be a student who originally has a valid right to participate in the online class but has forgotten the correct password 415, and is less likely to be a learner (an unauthorized user) who does not have the valid right. As a result, it is determined that the learner 502 is valid (authenticated or authorized). In such case where the temporary login of the learner 502 is appropriate, the temporary login is permitted as follows.

The temporary-login permission unit 545 permits the temporary login of the learner 502 to the educational service on the basis of the determination result that the learner 502 is valid (authenticated). Then, the temporary-login permission unit 545 writes that the login state of the learner 502 is the temporary login state in the login management data 517.

Next, a case where the global IP address 305 of the terminal 130-2 is different from the global IP address 305 of the terminal 130-1 will be described. In this case, it is determined that the learner 502 is not valid (authorized), and the temporary login is not permitted.

The login prohibition unit 550 prohibits the learner 502 from logging in to the educational service (both the normal login and the temporary login) on the basis of the determination that the learner 502 is not valid or authenticated (i.e., the temporary login is not permitted). Then, the login prohibition unit 550 writes that the login state of the learner is a logout state (a login prohibition state) in the login management data 517. The prohibition of the normal login and the temporary login prevents the unauthorized user from logging in to the educational service. This avoids a situation in which the normal login and the temporary login are unnecessarily permitted. As a result, security at the time of login can be appropriately ensured.

The notification unit 555 transmits (outputs) a notification to the user of the educational service in accordance with the login management data 517. For example, in response to the temporary login to the educational service being permitted on the basis of the determination that the learner 502 is valid (authenticated), the notification unit 555 notifies the user of the educational service different from the learner 502 (in this example, an administrator 503) of the information of the learner 502 through the monitor 7.

The information of the learner 502 includes, for example, information indicating that the learner 502 is in the temporary login state, the ID information 405 and the class information 425 of the learner 502, the history of the operation of the learner 502 during the temporary login period (the log of the terminal 130-2), and information indicating that the function of the educational service for the learner 502 is restricted (described later). When the notification is made to the administrator 503 as described above, the behavior of the learner 502 at the time of temporary login can be appropriately managed in the management terminal 120.

The notification unit 555 may notify the learner 501 of the information of the learner 502 (or the user of the terminal 130-2). As a result, the learner 501 in the normal login state can recognize that the learner 502 is in the temporary login state. It is possible to cause the learner 501 to recognize that the function of the educational service for the learner 502 is restricted as follows, and thus, it is possible to appropriately proceed with the online class.

The distribution unit 570 distributes the online class to the terminals 130-1 and 130-2 based on the login management data 517. The distribution unit 570 includes a function restriction unit 575 and a restriction release unit 580.

In a case where the temporary login of the learner 502 is permitted, the function restriction unit 575 restricts some functions of the educational service for the learner 502. The mode of the restriction is determined based on the restriction mode data 512 in the storage device 5. In this example, the restriction mode data 512 determines that the function of screen sharing (for example, the function of the terminal 130-2 displaying the worksheet of the learner 501) between the terminal 130-1 and the terminal 130-2 is restricted. The restriction mode data 512 is set by, for example, the administrator 503. Note that the function of the educational service for the learner 501 in the normal login state is not particularly restricted, unlike the function of the educational service for the learner 502 in the temporary login state.

The restriction mode data 512 may determine that the distribution time (the first distribution time) of the online class to the terminal 130-2 is restricted to be shorter than the distribution time (the second distribution period) of the online class to the terminal 130-1. In a case where a restriction is placed on some functions of the educational service as described above (for example, in a case where screen sharing or the distribution time is restricted), a screen indicating the restriction may be displayed on the monitor 7 of the terminal 130-2.

The restriction release unit 580 releases the functional restriction on the basis of the input of the correct password 415 of the learner 502 to the terminal 130-2 after the functional restriction by the function restriction unit 575 (that is, after the temporary login). The learner 502 can thus use the educational service without the functional restriction thereafter. As a result, the learner 502 can be effectively educated.

<Mode of Screen Displayed on Terminal of Learner>

Screens displayed on the monitor 7 of the terminal 130 (130-2) of the learner will be described with reference to FIGS. 6 to 8. FIG. 6 is a diagram illustrating screens (images) 600 and 650 displayed when the learner attempts to log in to the educational service according to one or more embodiments.

The screen 600 includes a message 602, input fields 605 and 610, and a button 615. The message 602 prompts the learner to input the ID information 405 and the password 515 in the input fields 605 and 610, respectively. The button 615 is operated by the learners 501 and 502 who attempt to log in after the ID information 405 and the password 515 are input.

In a case where the button 615 is operated with the password 515 input in the input field 610 being correct, the normal login is permitted (the learner 501). On the other hand, in a case where the button 615 is operated with the password 515 incorrect, the normal login is not permitted (the learner 502). In this example, the account of the learner 502 is locked, and then the screen 600 of the terminal 130-2 switches to the screen 650.

The screen 650 is displayed to accept or receive a request for temporary login on the basis of the fact that the normal login is not permitted. The screen 650 includes a message 603 and a button 620. The message 603 notifies the learner 502 that the account is in a locked state. Furthermore, the message 603 notifies the learner 502 to press the button 620 in a case where the user desires to use the service through the temporary login. The button 620 is operated by the learner 502 who attempts to temporarily log in. When the button 620 is operated, the terminal 130-2 transmits a signal (in other words, the request for temporary login on the screen 650) indicating the operation to the management terminal 120. Thereafter, the management terminal 120 receives this request from the terminal 130-2. In response to this request, the management terminal 120 executes the validity (authentication) determination processing described above. In this example, the management terminal 120 permits the temporary login of the learner 502 as a result of the determination processing.

FIG. 7 is a diagram for explaining screens 700 and 750 displayed on the monitor 7 of the terminal 130-2 in a case where the learner is in the temporary login state and the normal login state.

The screen 700 includes messages 710 and 730, a button 720, and an input field 735. The message 710 indicates that a restriction is placed on some functions of the educational service (in this example, the distribution time of the online class is restricted) because the learner 502 is in the temporary login state. The button 720 is operated for the learner 502 to participate in the online class corresponding to the grade and the subject selected by the learner 502. The message 730 prompts the learner 502 to input the correct password 515 in the input field 735 if the learner remembers the correct password (or is told by another person). When the correct password 515 is input in the input field 735, the state of the learner 502 changes from the temporary login state to the normal login state without restriction of functions. As a result, the screen 700 is switched to the screen 750.

When the learner operates the button 720 after the screen 750 is displayed, the learner can participate in the online class in a state where the functions of the educational service are not restricted (without restriction of the distribution time).

FIG. 8 is a diagram illustrating screens 800 and 850 displayed on the monitor 7 when the button 720 is operated.

The screen 800 includes a worksheet 810, messages 820 and 730, and an input field 735. The worksheet 810 is a teaching material used by the learner 502 during the online class and is writable. The message 820 indicates that the worksheets of other students (for example, the learner 501) are not displayed using screen sharing because the learner 502 is in the temporary login state.

When the learner 502 remembers the correct password 515 and inputs the correct password in the input field 735, the login state of the learner changes from the temporary login state to the normal login state. As a result, the screen 800 is switched to the screen 850. The screen 850 is also displayed in a case where the button 720 is pressed on the screen 750.

The screen 850 includes a worksheet 860 of another student (in this example, the learner 501) and a worksheet 870 of yet another student. The worksheets 860 and 870 are displayed by screen sharing between the terminal 130-2 and other terminals 130.

In this example, when permitting the temporary login of the learner 502, the management terminal 120 distributes the online class to the terminal 130-2 in such a manner that the worksheet 860 of the learner 501 is not displayed on the monitor 7 (the screen 800) of the terminal 130-2. Meanwhile, when permitting the temporary login of the learner 502, the management terminal 120 may distribute the online class to the terminal 130-1 in such a manner that the worksheet 810 of the learner 502 is not displayed on the monitor 7 of the terminal 130-1 of the learner 501.

<Control Structure of Management Terminal>

A control structure of the management terminal 120 according to one or more embodiments will be described with reference to FIGS. 9 to 11. FIG. 9 is a flowchart illustrating an example of processing executed by the management terminal 120 according to one or more embodiments.

This flowchart is executed on a learner to be processed (a target learner). This flowchart starts when the ID information 405 and the password 515 of the target learner are input in the respective input fields 605 and 610 of the screen 600 displayed on the monitor 7 of the terminal 130 of the learner, and then the button 615 is pressed.

The management terminal 120 receives the ID information 405 and the password 515 of the target learner from the terminal 130 (step S905). The management terminal 120 reads the correct password 415 associated with the ID information 405 from the learner information 400 (step S910).

The management terminal 120 determines whether or not the received password 515 is correct, that is, whether or not the received password is registered in the management terminal 120 in association with the ID information 405 and (step S915). Specifically, the management terminal 120 determines whether or not the received password 515 matches the correct password 415.

If the password 515 is registered, that is, matches the correct password 415 (YES in step S915), the management terminal 120 permits the normal login of the target learner (step S917), and then ends the control.

On the other hand, if the password 515 is not registered, that is, is different from the correct password 415 (NO in step S915), the management terminal 120 does not permit the normal login. The management terminal 120 locks the account of the target learner on the basis of not permitting the normal login (step S920), and displays the screen 650 including a temporary login button (the button 620) on the terminal 130 (step S925).

Thereafter, when detecting that the temporary login button has been pressed by the target learner, that is, receiving a request for temporary login on the screen 650 (step S930), the management terminal 120 executes validity (authentication) determination processing in response to the reception of the request (step S935). A detailed procedure of the determination processing will be described with reference to FIG. 10.

The management terminal 120 switches the control based on whether or not the target learner is determined to be valid (authenticated) (step S940). When determining that the target learner is not valid (authenticated) (NO in step S940), the management terminal 120 prohibits login (including both the normal login and the temporary login) to the educational service (step S942). For example, the management terminal 120 manages access from the terminal 130 to the management terminal 120 in such a manner that neither the screen 700 nor 750 is displayed on the terminal 130 of the target learner.

On the other hand, when determining that the target learner is valid (authenticated) (YES in step S940), the management terminal 120 permits the temporary login of the target learner (step S945). Thereafter, the control proceeds to step S950 including steps S952 to S956.

Specifically, the management terminal 120 executes the function restriction processing of restricting the function of the online class on the basis of permitting the temporary login of the target learner (step S952). The management terminal 120 may execute step S952 before step S945. After step S952, when detecting the input of the correct password 415 by the target learner (step S954), the management terminal 120 releases the restriction of the function of the online class to the target learner on the basis of the fact that the correct password 415 is input to the terminal 130 after the temporary login (step S956). Then, the management terminal 120 changes the login state of the target learner from the temporary login state to the normal login state, and ends the control.

In step S945, the management terminal 120 may permit the normal login. In this case, the management terminal 120 does not execute step S950.

Figure 10:
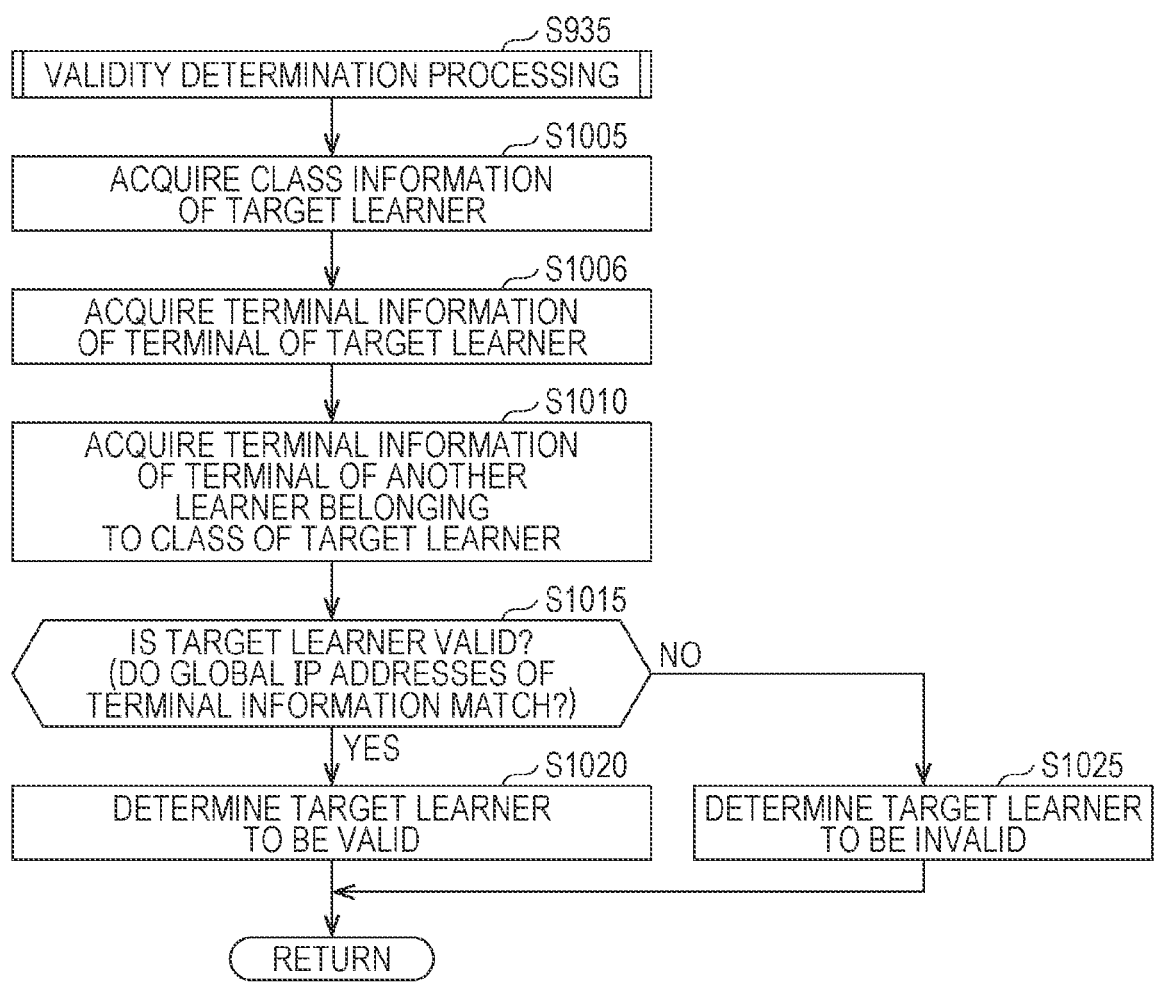
FIG. 10 is a flowchart illustrating an example of a detailed procedure of validity (authentication) determination processing (step S935 in FIG. 9)

FIG. 10 is a flowchart illustrating an example of a detailed procedure of the validity (authentication) determination processing (step S935 in FIG. 9) according to one or more embodiments. At the start of this flowchart, the management terminal 120 is assumed to be communicable with each of the terminal 130 of the target learner (in this example, the learner 502) and the terminal 130 of another learner (in this example, the learner 501) belonging to the class of the target learner.

The management terminal 120 acquires the class information 425 of the target learner from the learner information 400 (step S1005). Specifically, the management terminal 120 acquires the class information 425 associated with the received ID information 405 from the learner information 400.

The management terminal 120 acquires the terminal information 300-2 of the target learner from the terminal 130-2 (step S1006). The terminal information 300-2 includes the global IP address 305 (a first address) of the terminal 130-2.

The management terminal 120 acquires the terminal information 300-1 of another learner belonging to the class of the target learner from the terminal 130-1 (step S1010). Specifically, the management terminal 120 determines a learner having the same class information 425 as the class information 425 of the target learner from logged-in learners based on the login management data 517. The management terminal 120 acquires the terminal information 300-1 of the learner based on the ID information 405-1 of the learner. The terminal information 300-1 includes the global IP address 305 (a second address) of the terminal 130-1.

The management terminal 120 determines whether or not the target learner is valid (authenticated) based on the terminal information 300-2 of the target learner (step S1015). In this example, the management terminal 120 executes this determination processing by determining whether or not the first address matches the second address. If the first address matches the second address (YES in step S1015), the management terminal 120 determines that the target learner is valid (authenticated) (step S1020). On the other hand, if the first address does not match the second address, the management terminal 120 determines that the target learner is not valid (authenticated) (step S1025). After step S1020 or S1025, the control returns to step S940.

In the validity (authentication) determination processing, the global IP address 305 may be replaced with the user agent information 315 or the MAC address information 320 of the terminal information 300. Alternatively, the management terminal 120 may determine whether or not another target learner belonging to the class of the target learner is logged in, and permit the temporary login of the target learner if the another target learner is logged in.

FIG. 11 is a flowchart illustrating another example (step S1100) of the processing executed by the management terminal 120 after step S945 according to one or more embodiments. This flowchart is different from the flowchart of step S950 in FIG. 10 in that the processing of steps S1110, S1120, and S1130 is added.

The management terminal 120 notifies the administrator 503 of the class information 425 of the target learner on the basis of permitting the temporary login of the target learner (in this example, the learner 502) (in other words, determining that the target learner is valid (authenticated)) (step S1110). The information of the target learner includes the ID information 405 and the class information 425 of the learner 502. This notification is displayed, for example, on the monitor 7 of the management terminal 120.

The management terminal 120 notifies other learners (for example, the learner 501) that the function of the online class for the target learner is restricted (step S1120). The management terminal 120 executes steps S954 and S956, and thereafter, the temporary login period ends by the processing. The management terminal 120 notifies the administrator 503 of the history (the log) of the operation of the terminal 130-2 by the learner 502 during the temporary login period (step S1130), and ends the control.

In the above description, in a case where the administrator 503 requests the interruption of the distribution of the online class to the terminal 130-2 after the notification of the information of the target learner (after step S1120), the management terminal 120 may interrupt the distribution of the online class to the terminal 130-2. For example, in a case where the administrator 503 has found that a suspicious behavior of the target learner has been detected during the temporary login, the administrator requests the interruption of the distribution using the mouse 2 or the keyboard 3 of the management terminal 120.

According to such a configuration, for example, in a case where a suspicious behavior of the target learner is detected during the temporary login, the distribution of the online class to the terminal 130-2 is interrupted. As a result, it is possible to avoid a situation in which the online class is inappropriately viewed by an unauthorized user in a case where the learner 502 is the unauthorized user.

Figure 12:
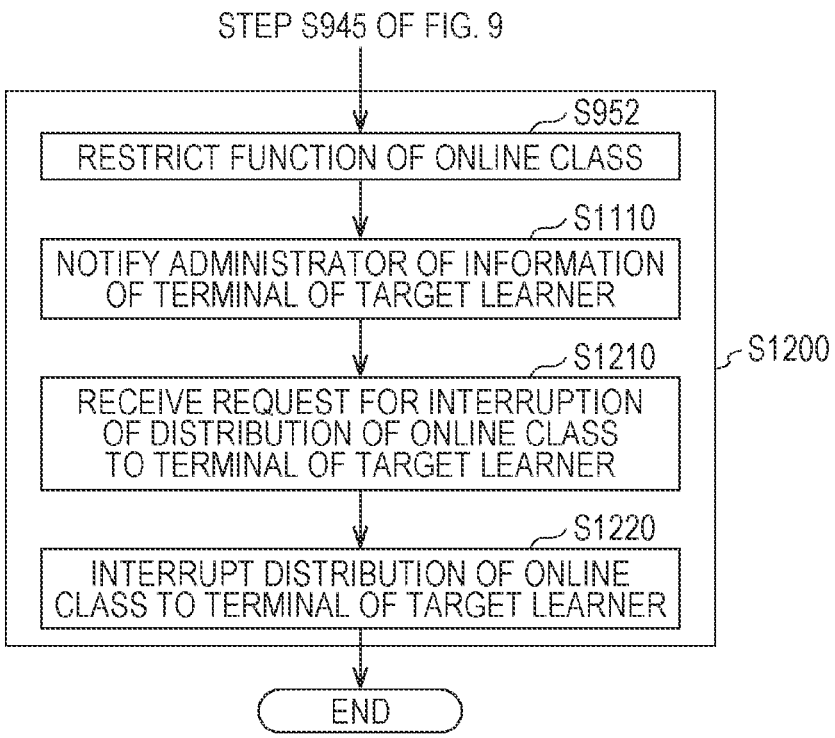
FIG. 12 is a flowchart illustrating another example (step S1200) of the processing executed by the management terminal after step S945.

FIG. 12 is a flowchart illustrating another example (step S1200) of the processing executed by the management terminal 120 after step S945. This flowchart is different from the flowchart of step S1100 in FIG. 11 in that the processing of steps S1210 and S1220 is executed instead of the processing of steps S1120, S954, S956, and S1130.

The management terminal 120 receives a request for the interruption of distribution of the online class to the terminal 130-2 of the target learner (the learner 502) from the administrator 503 via the mouse 2 or the keyboard 3 (step S1210). The management terminal 120 interrupts the distribution of the online class to the terminal 130-2 of the target learner on the basis of this request (step S1220), and ends the control.

As described above, even in a case where the normal login is not permitted due to the incorrect password 515, the management terminal 120 according to one or more embodiments permits the temporary login of the learner to the educational service on the basis of the validity (authentication) of the learner. Therefore, even in a case where the learner (the student) cannot input the correct password 415, it is possible to appropriately use the educational service. Among various services that can be provided to the user through the terminal device, the educational service is particularly useful from the viewpoint of user's awareness. Therefore, according to one or more embodiments, the user can be particularly benefited.

In a case where the account of the learner is locked because the correct password is not input, and then complicated unlocking means such as multi-factor authentication (MFA) is required for the learner, an adult learner may address this authentication, but a small child learner may not be able to address this authentication. Therefore, there is a possibility that the child learner cannot unlock the account. Until the child remembers the correct password 415 or until the account is unlocked by another person (for example, a parent or a teacher), the learning opportunity for the child may be lost in the educational institution. This learning opportunity includes an opportunity to participate in an online class and an opportunity to do homework for the online class.

On the other hand, in some embodiments, even in a case where the learner is a small child and the child cannot input the correct password, the child can immediately participate in the online class by pressing the button 620 (the temporary login button). As a result, it is possible to avoid a situation in which the learning opportunity for the child is lost. As described above, some embodiments are particularly effective in a case where the learner is a child, and is useful for all of primary education, secondary education, and higher education.

First Modification of Embodiments

In the above embodiments, as an example of the function restricted in the function restriction processing (step S952), the restriction of the function of screen sharing between the terminal 130-1 and the terminal 130-2 or the restriction of the distribution time of the online class to the terminal 130-2 has been described. In a first modification, other modes of the function restriction processing will be described. The mode of the function restriction processing may be any one of the following modes or a combination of at least two of the following modes.

The function restriction processing may include stopping the creation (the update) of the history information 435 of the target learner who is temporarily logged in. As a result, since the history information 435 is created only in a case where the normal login is permitted, it is possible to prevent the amount of data of the history information 435 from excessively increasing.

The function restriction processing may include restricting the operation of editing the account information 445 by the target learner who is temporarily logged in. As a result, the processing load on the management terminal 120 can be appropriately reduced.

The function restriction processing may include distributing the online class to the terminal 130-1 in such a manner that the image of a teacher is displayed on the monitor 7 of the terminal 130-1 of the learner who is normally logged in, while distributing the online class to the terminal 130-2 in such a manner that the image of the teacher is not displayed on the monitor 7 of the terminal 130-2 of the target learner who is temporarily logged in. As a result, the communication load on the WAN 150 can be appropriately reduced.

The function restriction processing may include distributing, out of a first class that is an online class conducted in real time and a second class (for example, a past online class) different from the first class, only the first class to the terminal 130-2. The first class may be conducted in real time by a first teacher who is the class teacher of the target learner who is temporarily logged in. As described above, when only the first class is distributed to the terminal 130-2, it is possible to minimize the types of online classes that the target learner can participate in. As a result, the communication load on the WAN 150 can be appropriately reduced.

The function restriction processing may include, in a case where the target learner performs the operation of doing homework for the online class, permitting only the operation of doing homework with a short submission deadline. Specifically, the function restriction processing may include allowing such an operation for the homework only in a case where the time interval between the submission deadline and the current date and time is shorter than a predetermined time interval (for example, 48 hours), and otherwise disabling such an operation for the homework.

New online classes or homework may be added in the educational service. In such a case, the function restriction processing may include distributing the online class to the terminals 130-1 and 130-2 in such a manner that the class can be viewed or the learner can do homework on the terminal 130-1 of the learner who is normally logged in while the class cannot be viewed or the learner cannot do homework on the terminal 130-2.

The function restriction processing may include restricting the communication (for example, information transmission such as chat between terminals) between the terminal 130-1 and the terminal 130-2. As described above, the mode of the function restriction processing is not limited, and may be appropriately determined.

Second Modification of Embodiments

In the above embodiments and the first modification thereof, the validity (authentication) determination processing is executed based on the terminal information 300-2 of the target learner who attempts to be in a temporary login state (step S935). In a second modification, the validity (authentication) determination processing is assumed to utilize feature information indicating the feature of the target learner.

The feature of the target learner is, for example, the face of the target learner or the background (for example, the interior of a room) of the target learner. These features are determined based on a camera image generated by the camera 9 of the terminal 130-2. The feature of the target learner may be a voice of the target learner input to the microphone 8 of the terminal 130-2. As described above, the feature information may be either voice information of the learner or information representing the image of the learner, and is included in the output signal 110-2.

As described below, the feature information is compared with reference feature information that is a reference. The reference feature information is determined in advance for each learner based on the history of the feature information (the history information 435), and is stored in the storage device 5 of the management terminal 120.

Figure 13:
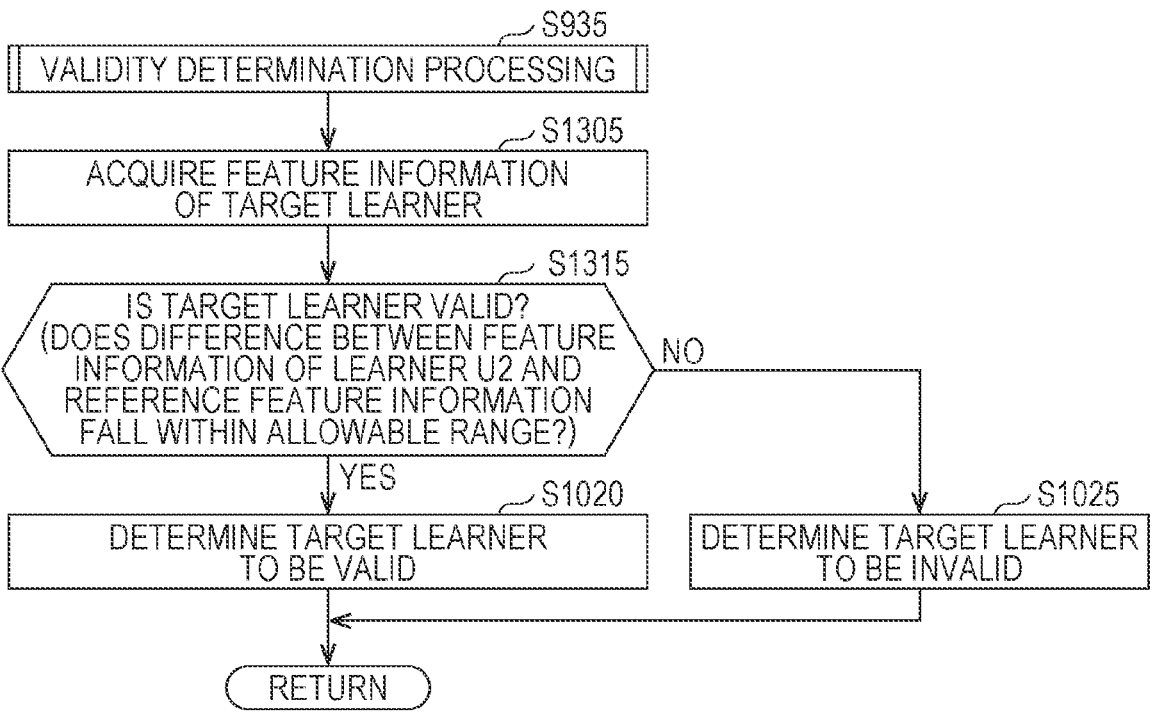
FIG. 13 is a flowchart illustrating another example of the detailed procedure of the validity (authentication) determination processing (step S935)

A control structure of the management terminal 120 according to the second modification will be described with reference to FIG. 13. FIG. 13 is a flowchart illustrating another example of the detailed procedure of the validity (authentication) determination processing (step S935) according to one or more embodiments.

The management terminal 120 acquires the feature information of the target learner (the learner 502) who attempts to temporarily log in from the terminal 130 (step S1305). The management terminal 120 acquires the feature information on the basis of the output signal 110-2.

The management terminal 120 determines whether or not the target learner is valid (authenticated) based on the feature information of the learner 502 (S1315). In this example, the management terminal 120 compares the feature information with the reference feature information, thereby determining whether or not a difference between the feature information and the reference feature information falls within a predetermined allowable range (for example, these pieces of information are matched). This determination processing is executed using, for example, a known image recognition technology or voice recognition technology.

If the difference between the feature information and the reference feature information is within the allowable range (YES in step S1315), the management terminal 120 executes the process of step S1020. On the other hand, if the difference between the feature information and the reference feature information is outside the allowable range (NO in step S1315), the management terminal 120 executes the process of step S1025. After step S1020 or S1025, the control returns to step S940.

According to the second modification, the feature of the target learner who attempts to temporarily log in can be reflected in the validity (authentication) determination processing. As a result, the validity (authentication) determination processing can be appropriately executed.

Third Modification of Embodiments

In a third modification of one or more embodiments, in a case where the password 515 does not match the correct password 415 (that is, on the basis of the fact that the normal login is not permitted), the management terminal 120 inquires of the administrator 503 whether or not the target learner is valid (authenticated) via the monitor 7 or the microphone 8. For example, the management terminal 120 displays a screen including a message for making this inquiry and a camera image transmitted from the terminal 130 of the target learner to the management terminal 120 on the monitor 7 of the management terminal 120.

For example, the administrator 503 observes whether or not the face of the target learner (the learner 502) in the camera image is different from the actual face of the learner. Based on the result of the observation, the administrator 503 performs an operation indicating the answer to the above inquiry (whether or not the target learner is valid (authenticated)) using the mouse 2 or the keyboard 3. For example, the management terminal 120 receives an operation indicating that the target learner is valid (authenticated) from the administrator 503. The management terminal 120 then permits the temporary login to the educational service on the basis of this operation.

Figure 14:
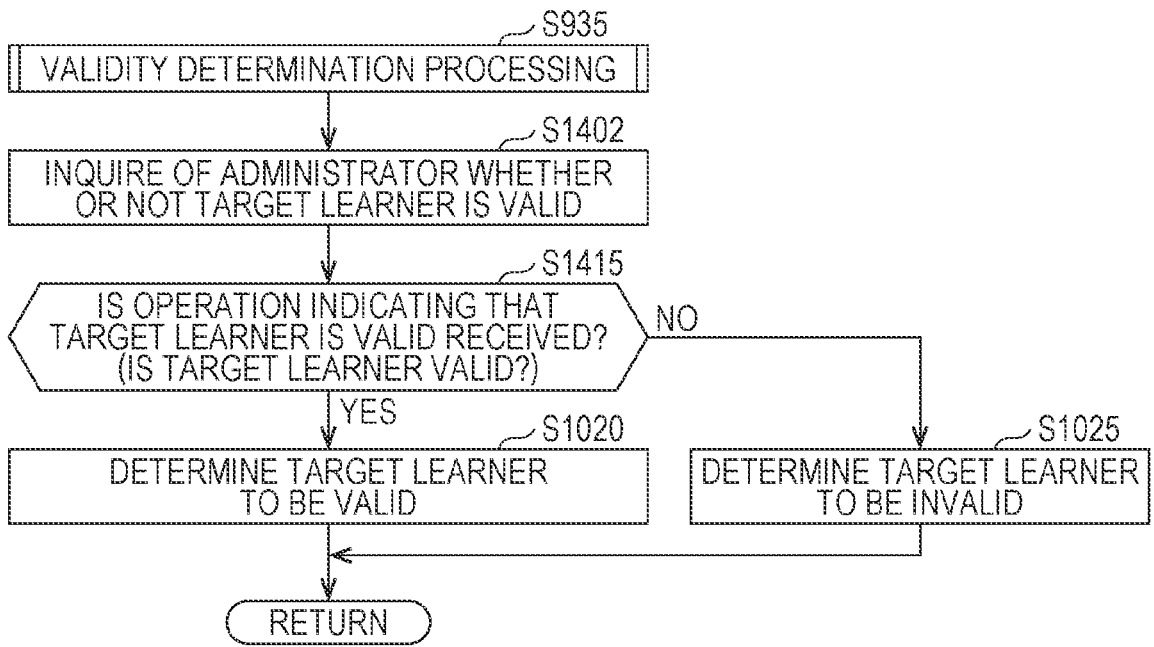
FIG. 14 is a flowchart illustrating yet another example of the detailed procedure of the validity (authentication) determination processing (step S935)

A control structure of the management terminal 120 according to the third modification will be described with reference to FIG. 14. FIG. 14 is a flowchart illustrating yet another example of the detailed procedure of the validity (authentication) determination processing (step S935) according to one or more embodiments.

The management terminal 120 inquires of the administrator 503 whether or not the target learner (the learner 502) is valid (authenticated) (step S1402).

The management terminal 120 determines whether or not the target learner is valid (authenticated) based on the result of the inquiry (step S1415). Specifically, the management terminal 120 switches the processing based on whether or not the operation indicating that the target learner is valid (authenticated) is received from the administrator 503.

If this operation is received (YES in step S1415), the management terminal 120 executes the processing of step S1020. On the other hand, if this operation is not received (NO in step S1415), the management terminal 120 executes the processing of step S1025. After step S1020 or S1025, the control returns to step S940.

According to the third modification, the result of the inquiry to the administrator 503 (the intention of the administrator 503) can be reflected in the validity (authentication) determination processing. As a result, the validity (authentication) determination processing can be appropriately executed.

Fourth Modification of Embodiments

In a fourth modification of one or more embodiments, yet another mode of the validity (authentication) determination processing will be described. For example, the management terminal 120 may execute the validity (authentication) determination processing based on the history information 435. Since the history information 435 includes the history of the terminal information 300, it includes the global IP address 305 (the previous IP address) when the learner 502 previously temporarily logged in or normally logged in to the educational service.

The management terminal 120 may acquire the global IP address 305 (the current IP address) of the terminal 130-2 when the learner 502 presses the button 620 (the temporary login button) while the account is locked, and execute the validity (authentication) determination processing based on whether or not the current IP address matches the previous IP address. The current IP address is included in the output signal 110-2. The global IP address 305 may be replaced with the user agent information 315 or the MAC address information 320.

The management terminal 120 may execute the validity (authentication) determination processing by determining whether or not a part of a character string (a first character string) constituting the input password 515-2 matches a part of a character string (a second character string) constituting the correct password 415 of the learner 502. The management terminal 120 may permit the temporary login on the basis of the fact that parts of these character strings match. For example, the management terminal 120 calculates the matching rate of the first character string and the second character string, and permits the temporary login in a case where the matching rate is equal to or larger than a threshold (for example, 0.9). On the other hand, in a case where the matching rate is less than the threshold, the management terminal 120 does not permit the temporary login.

The management terminal 120 may execute the validity (authentication) determination processing by determining whether or not the current time is in a predetermined time period. The predetermined time period is, for example, a time period (as an example, a time period in which the login probability is higher than a threshold probability) in which the learner 502 frequently uses the educational service. This time period is determined based on the history information 435. The management terminal 120 determines the time period on the basis of the history information 435 associated with the ID information 405 included in the output signal 110.

The predetermined time period may be a time period in which the online class is conducted by the class teacher of the learner 502. The management terminal 120 determines the class teacher and the time period on the basis of the class information 425 associated with the ID information 405 included in the output signal 110. When the predetermined time period is determined in this manner, the learner 502 cannot participate in an online class by a teacher different from the class teacher, but can participate in the online class by the class teacher. Therefore, the management terminal 120 can appropriately determine the permission and non-permission of the temporary login while minimizing the types of online classes that the learner 502 can participate in.

Fifth Modification of Embodiments

Figure 15:
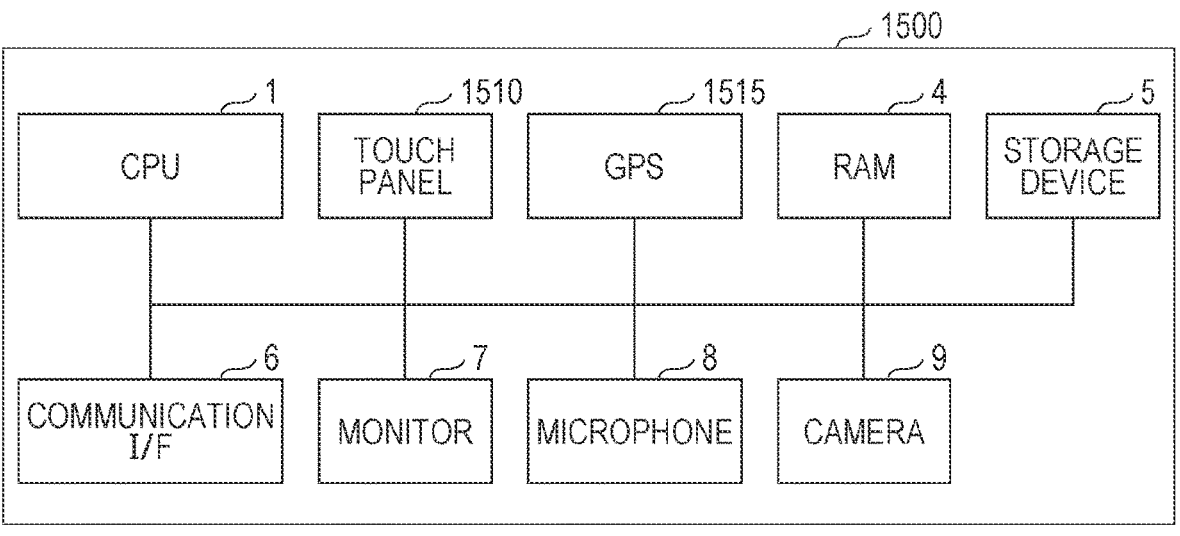
FIG. 15 is a block diagram illustrating a hardware configuration of a mobile terminal.

A configuration of a mobile terminal 1500 that functions as the management terminal 120 or the terminal 130 in the system 100 according to one or more embodiments will be described with reference to FIG. 15. FIG. 15 is a block diagram illustrating a hardware configuration of the mobile terminal 1500.

The mobile terminal 1500 is different from the computer device 200 in including a touch panel 1510 and a global positioning system (GPS) receiver 1515. In other respects, the configuration of the mobile terminal 1500 is similar to the configuration of the computer device 200. The mobile terminal 1500 is, for example, a tablet or a smartphone.

The touch panel 1510 is an input device that receives an input of an operation by a user, and is used instead of the mouse 2 and the keyboard 3. The GPS receiver 1515 acquires the position information of the mobile terminal 1500. This position information is transmitted to the CPU (a hardware processor) 1 of the mobile terminal 1500.

Hereinafter, as an example, a case where the management terminal 120 is the computer device 200 and the terminal 130 is the mobile terminal 1500 will be described. In this case, the position information of the mobile terminal 1500 is used as a part of the terminal information 300 included in the output signal 110.

In a case where the temporary login button (the button 620) is pressed by the learner, the management terminal 120 may execute the validity (authentication) determination processing based on the position information acquired by the GPS receiver 1515. Specifically, the management terminal 120 determines, based on the position information of the mobile terminal 1500, whether or not the learner is located in an area (for example, a school) determined in advance as an area in which the online class is distributed.

In a case where the position of the mobile terminal 1500 is in the above area, the learner is in the area, and thus, there is a high possibility that the learner has a valid right. Therefore, the management terminal 120 determines that the learner is valid (authenticated) and permits the provisional login of the learner. In a case where the position of the mobile terminal 1500 is not within the above area, the management terminal 120 determines that the learner is not valid (authenticated), and prohibits the normal login and the temporary login of the learner.

As described above, the management terminal 120 may execute the validity (authentication) determination processing on the basis of the position information of the terminal 130 (the mobile terminal 1500) without using the ID information 405 and the password 515.

Other Modifications

In the above embodiments and the first to fifth modifications, the service provided to the user through the terminal 130 is the educational service. On the other hand, the service may be another service such as an online conference support service or an intranet communication support service. Even in such a service, it is effective to permit a temporary login (or a normal login) in a case where the user cannot correctly input the password.

In the above embodiments and the first to fifth modifications, the management terminal 120 permits the temporary login of the user in a case where the user cannot correctly input the password 515. On the other hand, in a case where the user has an integrated circuit (IC) card, the management terminal 120 may acquire the authentication information of the user extracted by scanning the IC card, and determine whether or not to permit the temporary login of the user based on the result of acquisition of the authentication information.

For example, in a case where the authentication information does not match the reference authentication information of the user (that is, in a case where the scanned IC card is not the original IC card of the user), the management terminal 120 does not permit the normal login. Thereafter, the management terminal 120 executes the validity (authentication) determination processing (for example, makes an inquiry to the administrator 503), and determines whether or not to permit the temporary login of the user based on the result. The reference authentication information is determined for each user in association with the ID information 405 of the user, and is stored in the reference authentication information set 410. The authentication information is not limited to a password or passcode.

The normal-login determination unit 525 may determine whether or not to permit the normal login based on whether or not the password 515 is registered in the external server of the management terminal 120 in association with the ID information 405. In this case, the learner information 400 is stored as a database in the external server, and the management terminal 120 inquires of the external server whether the password 515 received from the terminal 130 is registered in association with the ID information 405. The management terminal 120 determines whether or not to permit the normal login based on the result of the inquiry. As described above, the storage location of the learner information 400 (the registration location of the combination of the ID information 405 and the correct answer password 415) is not limited to the management terminal 120.

The terminal information 300 may include at least one of the position information of the terminal 130, the global IP address 305, the user agent information 315, or the MAC address information 320.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A method executed by a hardware processor of a computer to manage use of an educational service at a terminal device, the method comprising:
   receiving, from the terminal device via a communication network, an output signal including identification information and authentication information that are input by a user to the terminal device to log in to the educational service;
   determining whether a login to the educational service is permitted based on the identification information and the authentication information; and in a case where the login to the educational service is not permitted, permitting a temporary login in which a restriction is placed on some functions of the educational service, wherein the determining whether the login to the educational service is permitted includes:

based on a global IP address contained in the output signal received from the terminal device, identifying a class to which the user belongs, and upon determining that the global IP address matches with a global IP address of another terminal device of another user who belongs to the identified class and normally logs in, determining that the user is capable of logging in, and the restriction includes at least one of:

limiting a time during which the user can join a class provided by the educational service, and prohibiting viewing another user's screen during the class.

2. The method according to claim 1, wherein the permitting the temporary login includes:

causing the terminal device to display an image that receives a request for the temporary login;

receiving the request via the image displayed in the terminal device; and in response to the receiving the request, permitting the temporary login.

3. The method according to claim 1, further comprising:

after the temporary login, in a case where authentication information registered in association with the identification information is input to the terminal device, releasing the restriction.

4. A method executed by a hardware processor of a computer to manage use of an educational service at a terminal device, the method comprising:

receiving, from the terminal device via a communication network, an output signal including identification information and authentication information that are input by a user to the terminal device to log in to the educational service;

determining whether the user is valid based on the output signal in response to input authentication information that is not registered in association with the identification information; and permitting, based on a determination that the user is valid, a temporary login in which a restriction is placed on some functions of the educational service, wherein the determining whether the user is valid includes:

based on a global IP address contained in the output signal received from the terminal device, identify a class to which the user belongs, and upon determining that the global IP address matches with a global IP address of another terminal device of another user who belongs to the identified class and normally logs in, the determining that the user is valid, and the restriction includes at least one of:

limiting a time during which the user can join a class provided by the educational service, and prohibiting viewing another user's screen during the class.

5. The method according to claim 4, wherein the output signal further includes at least one of information representing an image of the user, information representing a voice of the user, a global internet protocol (IP) address of the terminal device, a media access control (MAC) address of the terminal device, user agent information of the terminal device, and position information of the terminal device.

6. The method according to claim 4, wherein the permitting includes:

inquiring of an administrator of the educational service whether the user is valid;

accepting, from the administrator, an operation indicating that the user is valid; and permitting the user to log in to the educational service based on the operation.

7. The method according to claim 4, wherein the permitting includes:

permitting the user to log in to the educational service based on a fact that a part of the input authentication information matches a part of authentication information registered in association with the identification information.

8. The method according to claim 4, further comprising:

prohibiting the user from logging into the educational service based on a determination that the user is not valid.

9. The method according to claim 4, further comprising:

in response to permitting the user to log in to the educational service based on the determination that the user is valid, notifying another user of the educational service of user information related to the user's access and validity.

10. The method according to claim 9, further comprising:

interrupting the educational service to the terminal device based on a request from an administrator of the educational service to interrupt the educational service to the terminal device after notification of the user information.

11. The method according to claim 10, further comprising:

in response to permitting the user to log in to the educational service based on the determination that the user is valid, notifying the administrator of a history of operation of the terminal device by the user during a period in which the educational service is used.

12. A non-transitory computer readable recording medium storing instructions that cause a hardware processor of a computer to execute the method according to claim 1.

13. A server comprising:

a memory that stores the instructions according to claim 12; and a hardware processor that executes the instructions.

14. A non-transitory computer readable recording medium storing instructions that cause a hardware processor of a computer to execute the method according to claim 4.

* * * * *